United States Patent [19]
Rocco, Jr.

[11] Patent Number: 5,642,386
[45] Date of Patent: Jun. 24, 1997

[54] DATA SAMPLING CIRCUIT FOR A BURST MODE COMMUNICATION SYSTEM

[75] Inventor: A. Gregory Rocco, Jr., Carlisle, Mass.

[73] Assignee: Massachusetts Institute of Technology, Cambridge, Mass.

[21] Appl. No.: 268,635

[22] Filed: Jun. 30, 1994

[51] Int. Cl.$^6$ ........................................... H04L 7/00
[52] U.S. Cl. ........................... 375/355; 375/360
[58] Field of Search ........................ 375/354, 355, 375/360, 362; 370/110.1, 85.1; 327/9, 94, 141, 146, 101

[56] References Cited

U.S. PATENT DOCUMENTS

| | | | |
|---|---|---|---|
| 5,063,576 | 11/1991 | Eguchi et al. | 375/362 |
| 5,170,415 | 12/1992 | Yoshida et al. | 375/355 X |
| 5,251,238 | 10/1993 | Menk et al. | 375/355 |
| 5,497,374 | 3/1996 | Maruyama et al. | 370/85.4 |

*Primary Examiner*—Tesfaldet Bocure
*Assistant Examiner*—Bryan Webster
*Attorney, Agent, or Firm*—Wolf, Greenfield & Sacks, PC

[57] ABSTRACT

A data sampling circuit and method is provided for a burst mode communication system. The circuit is an entirely digital circuit for reliably sampling an incoming stream of data for automatically adjusting to variations in data stream clock rates and phase variations in the incoming data. The circuit includes a delay line, with a plurality of serially coupled taps, each tap having a variable delay. A first aspect of the invention includes increasing the delay time until the delay line captures at least one full data cell, but preferably two, of the incoming data stream (i.e., signal levels over at least one full clock period, defined by two transitions of the data stream), thereby aligning the receiving circuit with the frequency of the data stream clock. A second aspect of the invention includes outputting data from a tap that is selected to be midway between two regions of transitions of the incoming data stream, thereby aligning the receiving circuit with the phase of the data stream clock. The invention can, in alternative embodiments, track changes in the input data stream's phase/frequency. This involves updating the amount of delay in each tap of the delay line as well as picking the output of the appropriate tap to be used as the sampled data stream, in response to changes in the input signal as well as changes in propagation delays, of the circuits used to implement the delay line, resulting from temperature and voltage variations.

19 Claims, 12 Drawing Sheets

DATA SAMPLING CIRCUIT FOR A BURST MODE COMMUNICATION SYSTEM

GOVERNMENT RIGHTS

Development of this invention may have been supported by U.S. Air Force contract F19628-90-C-0002. The United States Government may have rights in this invention.

FIELD OF THE INVENTION

The present invention relates generally to bit-serial data communications and to data recovery circuits for adjusting for frequency and phase variations in the data stream with respect to a reference clock, particularly as applied to massively parallel computing systems and data networks.

BACKGROUND

In a computer system having multiple processors connected by a network of point to point bit-serial links, the point to point links may operate in burst mode—e.g., to save power. In this case, idle symbols are not transmitted as filler when there is no useful data to be transmitted. Accordingly, at the beginning of each newly received burst, a receiver must establish a correct phase relationship between the data stream and the receiver clock. i.e. the receiver must sample the incoming data stream at the frequency of the incoming data and within a defined range of phase to avoid an unacceptable error rate. The general approach to achieving proper phasing for sampling in the prior art is to create an internal reference clock within the receiver, synchronized to the frequency and phase of the incoming data. The process of synchronizing an internal reference clock with an incoming data stream is known as "clock recovery".

A conventional clock recovery method involves the use of a phase-locked loop (PLL). The PLL is essentially a phase detector and an oscillator in a feedback loop configuration. The phase detector compares the input signal (data) to the output of the oscillator and generates a control signal that varies with the phase difference. The phase of the oscillator's output is controlled by the output of the phase detector. The phase comparison and output phase adjustment process drives the oscillator's output to match (lock) to the phase of the input signal (data).

Until recently, PLL circuits have been implemented with analog technology. Implementing an analog PLL on an otherwise digital circuit presents several disadvantages. Early digital clock recovery circuits (sometimes called digital phase-locked loops) operate at frequencies much higher than the "recovered" clock-in fact, typically one to two orders of magnitude higher. These circuits severely limit the communication performance available from any given semiconductor technology. In the 1980's, digital clock recovery circuits operating at the same frequency as the recovered clock began to appear.

The following three patents disclose digital PLL's that support high data rate capability. Each of these digital PLL's assumes an incoming data stream of the same (or nearly the same) frequency as its reference clock, and produces a clock phase-locked to the data stream. All three synchronize over a relatively narrow range of frequencies.

U.S. Pat. No. 4,789,996, issued to Butcher on Dec. 6, 1988 discloses a center frequency high resolution digital phase-lock loop circuit. The receivers's reference clock is fed through an N-tap delay line where N≧(TREF/minimum tap propagation delay). Each tap introduces a fixed time delay. An N-bit left/right shift register is used to "switch in" the number of taps the reference clock travels through, and thus the amount of phase shift introduced. The phase detector compares the incoming data to the PLL output clock. Based on the output of the phase detector, a control circuit sends "shift left", "shift right", or "hold" commands to the shift register that advance, retard, or maintain the phase, respectively. The L/R shift register is adjusted one position at a time until a "stable" state is found. The maximum "settling time" is N+10 clock periods. Note that this is not a purely digital circuit. The 180 degree inhibit circuit uses an RC network. Butcher states that an all-digital inhibit circuit would not work as well (column 8, lines 7–9). The Butcher disclosure describes the basic concept of a digital PLL that employs a tapped delay line.

U.S. Pat. No. 4,819,251, issued to Nelson on Apr. 4, 1989, discloses a high speed non-return-to-zero digital clock recovery circuit. The Nelson circuit also uses an N-tap (N=10) delay line. In Nelson, the tapped delay line is used to produce delayed versions of a clock-in other words, different phases of the clock. It has a phase detector circuit which samples the incoming data with every delayed clock (i.e., there are 10 data samples). The phase detector counts how many of the 10 data samples transition from zero to one between the occurrence of a rising (logic zero to one) edge in the incoming data and rising edge in the oscillator output. This transition sum reflects the phase difference between the incoming data and the PLL output clock. The sum is compared to an upper and lower bound, and if not within the specified range, increment or decrement signals are generated that advance or retard, respectively, the phase of the oscillator's output. The PLL output is then used to sample the data.

U.S. Pat. No. 5,040,193, issued to Leonowich et al. on Aug. 13, 1991, discloses a receiver and digital phase-locked loop for burst mode data. In the Leonowich receiver, the reference clock (not the data) is fed into the delay line. Preferably, the delay line provides at least one clock period (T) of delay. All N tap outputs are fed to an N:1 multiplexer. The output of this multiplexer is the PLL clock output. The single synchronous transition detector (STD) compares the incoming data to the output clock, determining whether either a falling or rising edge has occurred in the data during the time the output clock is at a logic high level. It appears that half the clock cycle is used because the incoming data is Manchester encoded. All N cells of the "interlocked coincidence detector" (ICD) receive the ICD output as well as one of the delayed clocks. Each ICD cell checks whether the delayed clock it receives from the delay line is low or goes low during the time the ICD signal is active (again, active for at most one-half a clock cycle). The "interlocked" part of the name comes from the fact that only one cell's output can be active at a time—a cell can only have an active output if the previous cell in the chain has an inactive output: an active cell output disables the outputs of all cells "further down the line". The outputs from all the ICD cells form an N-bit word that is subtracted from the number of the currently selected tap: this difference is the phase difference/adjustment. Phase adjustment are enabled during reception of a frame's preamble, and disabled at all other times. A multiplexer switches in a high "loop gain" for faster lock, then a lower gain once lock is established.

There appear, in the prior art, to be no all-digital solutions to the clock synchronization problem that offer high data rate capability and also accommodate a wide range of data rates.

SUMMARY OF THE INVENTION

All three of the of the patents disclosed above, in one form or another integrate phase differences between the current clock and the ideal clock then provide a correction in order to move the phase of the actual clock closer to the ideal clock. Instead of responding to the average phase difference, embodiments of the present invention responds to peak variations in the phase of the incoming data. Because of this the present invention can do much better than prior art at recovering data from data streams where the distribution of the phase deviations is not a nice distribution—where nice might be for example, a gaussian or uniform distribution. There appear, in the prior art, to be no all digital solutions to the clock synchronization problem that offer high data rate capability and will do as good a job recovering data from signals with very irregular probability distributions of their phase jitter.

The present invention provides an all-digital data sampling circuit and related sampling method for a burst mode data communication system. It uses a digital delay line to capture a portion of the data stream. The delay line includes a fixed number of taps, each tap providing a variable delay time. A first aspect of the invention includes progressively increasing the total delay time of all delay elements until the delay line captures at least one full data cell, but preferably two, of the incoming data stream (i.e., signal levels over at least two full clock periods, defined by transitions of the data stream), thereby adjusting the length of the delays used in the receiving circuit to coincide with the frequency of the data stream clock.—In this document a data cell is a portion of the incoming signal that is bounded by regions where a transition may occur. For example, with 4/5 bit encoding, 4 bits of data are encoded into 5 data cells; with Manchester encoding 1 bit of data is encoded into two data cells.—A second aspect of the invention includes outputting data from a tap that is selected to be midway between groups of taps in the delay line where transitions occur, thereby aligning the data sampling circuit with the phase of the data and indirectly with the phase of the data stream's clock. This process can be thought of as acquiring the input data stream. A third aspect of the present invention is the ability to track changes in the input data stream's phase/frequency.

The invention is intended to be used, for example, in a massively parallel processor or data network, each with a globally distributed clock. In this situation, apparatus according to the present invention first acquires and then tracks the input signal. Updates to the lap picked as the sampling point are made just after the end of a frame of data, in such a way that no data is lost. The invention is further intended to be used in point to point links where the sender sends bursts of data, each with approximately the same phase as the previous one. An embodiment of the invention takes advantage of this by "remembering" the phase from the previous burst, using the same tap selection for the next burst. This permits the use of very short preambles; a preamble is data that the beginning of a frame provided for the purpose of synchronization only and does not contain information that is actually being used.

DETAILED DESCRIPTION

Figure 1:
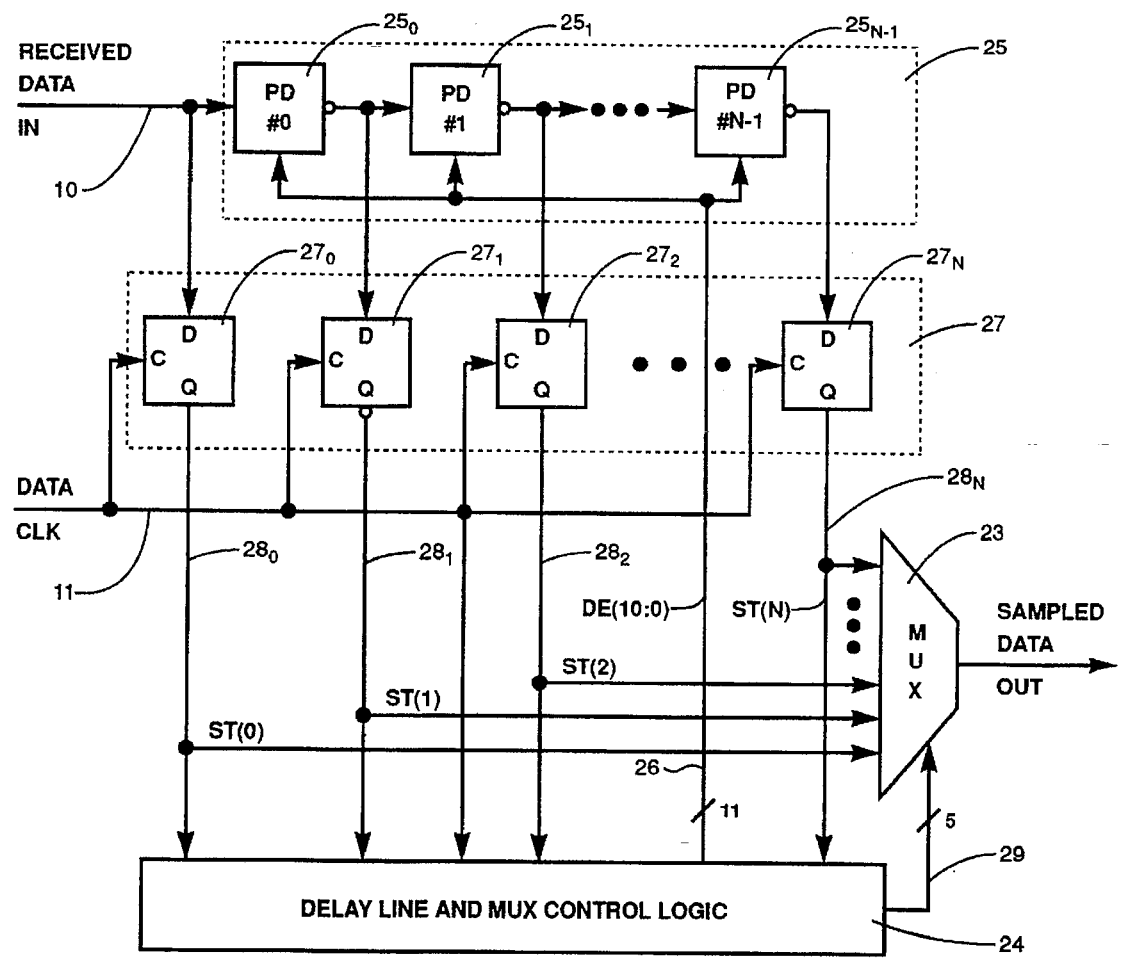
FIG. 1 is an overall block diagram of a sampling circuit according to a first embodiment of the present invention.

The present invention provides a method and an all digital circuit for practicing the method, for reliably sampling an incoming stream of digital data. It automatically adjusts to variations of data stream clock rates and phase variations in the incoming data. Key portions of the circuit of the present invention operate at the same clock rate as the clock rate of the incoming data so it does not impose design constraints that limit the performance of the system as a whole. The circuit serves to initialize the link by providing frequency and phase synchronization on power up and to maintain synchronization once the initial synchronization has been accomplished.

With the present invention the data stream clock is assumed to accompany the data. Although the phase of the clock with respect to the data does not need to be controlled, it is assumed that one cycle of the data stream clock is equal to one data cell of the incoming data. Three ways the clock might be distributed are:

1. By globally distributing the data clock to all devices that are receiving data. Note that if the same device is receiving multiple data streams it still only requires one clock (assuming that all the data streams are at the same data rate).

2. When using a bidirectional, point to point link, by adding a third, one-way link for the clock. It does not matter which station originates the clock so long as both stations are using the same clock. The present invention makes it unnecessary to control the phase of the clock so long as the phase does not change rapidly.

3. By providing to both the sender and receiver oscillators which are approximately at the same frequency, and using them to clock the data.

An important concept of the present invention is to "capture" at least one full data cell, of the transmitted data stream within a tapped delay line. In a described embodiment, the number of taps is fixed. Compensating for frequency differences involves adjusting the tap delays until at least one data cell, but preferably two, are contained within the delay line—This process of adjusting for the incoming frequency also adjusts for variations in the propagation delays of the delay elements used, fabrication variation, temperature and supply voltage changes as well as variation in the data rate of the incoming data stream. Compensating for phase differences involves detecting regions in the delay line where the inter-data-cell transitions are occurring and selecting the output of a tap which is approximately midway between two regions of transitions, so that the incoming stream is sampled at approximately the midpoint of each of the incoming data cells.

In a local area network or within a multi-processor system, where the same clock is globally distributed and the communication links are all point to point links, the phase of the data with respect to the clock will, generally, not change very much from one burst to the next. An embodiment of the present invention takes advantage of this by "remembering" the phase from the previous burst and using it for the next. This permits the use of very short preambles—a preamble is data at the beginning of a frame for the purpose of synchronization and does not contain data that is actually being used. It is believed that the present invention is the only one that "remembers" phase information from one burst to the next.

Instead of responding to the average phase difference, embodiments of the present invention respond to peak variations in the phase of the incoming data. Because of this the present invention does well at recovering data from data streams where the distribution of the phase deviations (jitter) is not a nice distribution—where nice might be for example, a Gaussian or uniform distribution.

FIG. 1 shows an overall block diagram of a exemplary data sampling circuit according to the present invention. FIG. 1 shows a digital delay line 25, an array of data sampling D flip-flops 27, a data selection multiplexer 23 and control logic circuit 24. In a typical embodiment, the delay line 25 has, for example, twenty-four programmable delays $25_0 \ldots 25_{N-1}$ (where N=24 in this example). The received data stream enters the delay line on line 10. The length of the delay for the programmable delays is set by the control signal on control line 26. In an exemplary embodiment, tap control line 26 carries eleven bits of data to pick one of 11 possible delay settings. In the illustrated embodiment of the present invention, the same delay value is set in each of the N taps. The output of each of the programmable delays $25_{k-1}$ (where k=1 ... N) is sampled by its corresponding D flip-flop $27_k$ (there is also a D flip-flop $27_0$ which samples the input to $25_0$): these D flip-flops $27_i$ (where i=0 ... N) are clocked by the data clock supplied on line 11. The output of every D-flip flop $27_i$ is carried on a corresponding one of lines $28_i$ to both the logic control circuit 24 and the multiplexer 23.

Notice that in the embodiment shown in FIG. 1, the programmable delays $25_{k-1}$ each invert the data stream as it propagates through them. This is done so that any effects due to asymmetry between rising and falling signals being propagated, by the circuits used to create the programmable delays, will not be additive as the data propagates through the delay line. Compensation for this inversion is provided by having every other (i.e. alternately) D flip-flop $27_i$ provide an inverted output.

Figure 2:
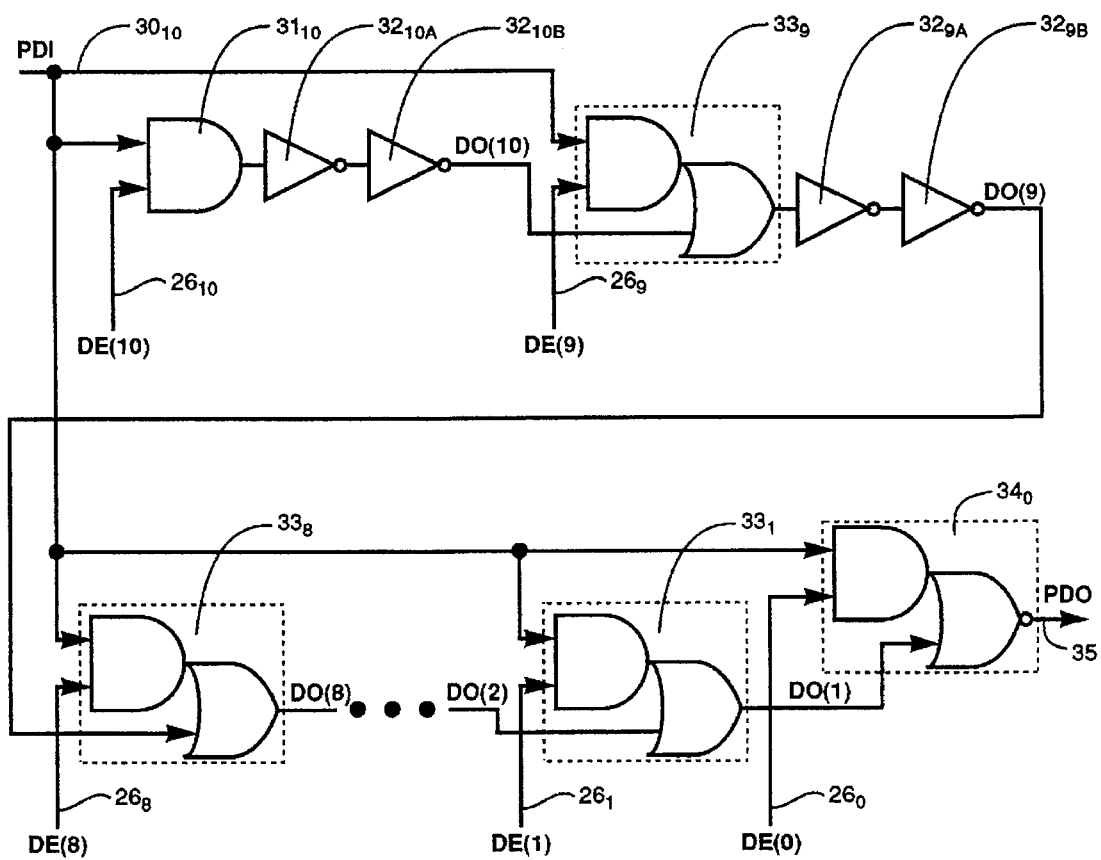
FIG. 2 is a logic diagram for a programmable delay circuit used to provide the delay for an individual tap of the lap delay line 25 of FIG. 1.

FIG. 2 shows a diagram of the logic used for the programmable delays $25_{k-1}$ in an embodiment of the present invention. Table I gives typical propagation delays for each of the circuit elements used in the programmable delay shown in FIG. 2. In a typical integrated circuit process in which the illustrated embodiment might be fabricated, the minimum delay might be as little as 0.65 of the typical, and the maximum delay might be as much as 1.8 of the typical, due to variations in process, temperature and power supply voltage. Line 30 is the input to the delay and line 35 is the output. The delay is programmed by having a single one of the eleven delay enable lines 26 (i.e., DE(10:0)) true (i.e., equal to logical one). If the minimum delay is desired. DE(0) is made a one. If the maximum delay is desired DE(10) is made a one. Table II gives the typical delays that are achieved by this embodiment.

TABLE I

Typical Propagation Delay for Circuit Elements Used to Create Programmable Delay the Illustrated Embodiment

| Circuit # | Delay (ns) | Description |
|---|---|---|
| $31_i$** | .31 | 2-input AND gate |
| $32_i$** | .12 | inverter |
| $33_i$** | .32 | OR the AND of two inputs with a third input |
| $34_0$ | .40* | OR the AND of 2 inputs with a 3rd input, INV output |

*Includes additional delay due to capacitive loading.
**"i" is simply used as a general placeholder for a subscript.

TABLE II

Typical Delays for Programmable Delays Used in the Illustrated Embodiment

| | | Delay in ns | | | |
|---|---|---|---|---|---|
| N | DE (10:0) | Total | Change | N/(N−1) | N/(N+1) | Freq (MHz)* |
| 0 | 000 0000 0001 | .40 | .40 | | .56 | 250.0 |
| 1 | 000 0000 0010 | .72 | .32 | 1.80 | .69 | 138.9 |
| 2 | 000 0000 0100 | 1.04 | .32 | 1.44 | .76 | 96.2 |
| 3 | 000 0000 1000 | 1.36 | .32 | 1.31 | .81 | 73.5 |
| 4 | 000 0001 0000 | 1.68 | .32 | 1.24 | .84 | 59.5 |
| 5 | 000 0010 0000 | 2.00 | .32 | 1.19 | .86 | 50.0 |
| 6 | 000 0100 0000 | 2.32 | .32 | 1.16 | .88 | 43.1 |
| 7 | 000 1000 0000 | 2.64 | .32 | 1.14 | .89 | 37.9 |
| 8 | 001 0000 0000 | .96 | .32 | 1.12 | .84 | 33.8 |
| 9 | 010 0000 0000 | 3.52 | .56 | 1.19 | .86 | 28.4 |
| 10 | 100 0000 0000 | 4.09 | .57 | 1.16 | | 24.6 |

*The data clock frequency that will cause data cells, within the delay line, to be 10 taps in length--1/(10 × delay).

Figure 3:
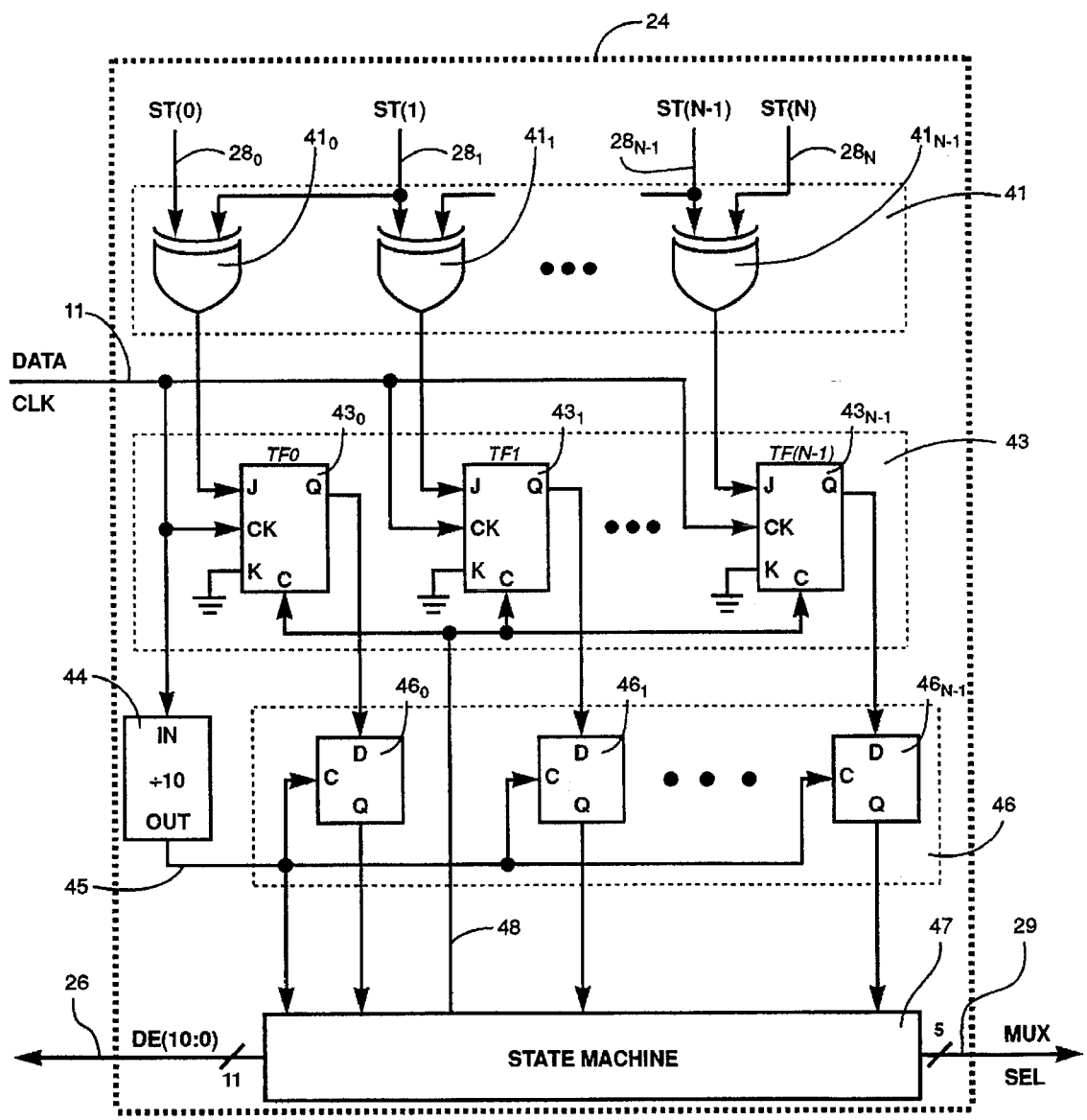
FIG. 3 is a block diagram of the delay line and multiplexer control logic used to control the programmable delay line 25 (FIG. 1) and the steering of the multiplexer 23 (FIG. 1), represented in FIG. 1 as circuit 24.

FIG. 3 shows a block diagram for an exemplary implementation of the control logic circuit 24. In the illustrated embodiment. The control logic circuit includes an array of XOR-gates 41, all array of type JK flip-flops 43 and an array of D flip-flops 46 feeding a state machine 47. The JK flip-flops 43 are clocked by the data stream clock 11. The XOR gates $41_0$–$41_{N-1}$ output a one when there is a transition, between consecutive data cells containing different values, in the programmable delay (at the time the D flip-flops $27_0$–$27_N$ were clocked) whose input and output is being compared by the XOR gate. The output of such XOR gate then goes to a corresponding J input of the corresponding one of JK flip-flops $43_0$–$43_{N-1}$. These JK flip-flops are used as transition flags. If there was a transition present in the corresponding programmable delay $25_0$–$25_{N-1}$ (FIG. 1) the JK flip-flop (transition flag) becomes set. Once set it will stay set until cleared by the state machine 47 (FIG. 3) using the signal on line 48. For example, if there is a transition in programmable delay $25_0$ at the time the D flip-flops $27_0$–$27_N$ are clocked, transition flag flip-flop TF0 ($43_0$, FIG. 3) will become set. The output of the JK flip-flops $43_0$–$43_{N-1}$ feed an array of D flip-flops $46_0$–$46_{N-1}$. These D flip-flops sample the output of the JK flip-flops at the clock rate of the state machine 47. In the illustrated embodiment the state machine is clocked at one-tenth the rate that the data is clocked. The divider 44 divides the data stream clock on line 11 by a factor of ten, creating the clock for the state machine, signal 45.

Returning now to FIG. 1, the output of each of the programmable delays $25_{k-1}$ is sampled by its corresponding D flip-flop $27_{k-1}$ to produce an output which is fed simultaneously to the control logic circuit 24 and the multiplexer 23. In the first mode of operation, the control logic circuit increases the programmable delay values via line 26 until at least one (preferably two) data cells are in the delay line and then picks which programmable delay output should be used as the sampled data stream. This mode of operation is active during power-up initialization and also during fault recovery when necessary—for example if the transmission medium was not available for a long enough period of time such that the second mode of operation cannot track the variation in either frequency or the change in propagation delay of the circuits within the data sampling circuit. The second mode of operation tracks changes in the phase of the incoming data and also the variation in either frequency or the change in propagation delay of the circuits within the data sampling circuit. The first mode can be thought of as acquiring the incoming signal and the second mode can be thought of as tracking the incoming signal.

Encoding and Protocol Used by The Illustrated Embodiment

Tables III and IV give some of the registers associated with the receiving and transmission of data. TCERRCNT, TOK, RTAPDLY, RTAPSAM, RINCPD, RDECPD, RDCLEN, RACNT, RATF, RCERRCNT and ROK are generally updated by the state machine 47 (FIG. 3) and are not generally written to directly. The other registers are options which affect the behavior of the illustrated embodiment. Their behavior will be discussed.

TABLE III

Transmit Status/Control Registers in the Illustrated Embodiment

| Mnemonic | # of bits | Description |
| --- | --- | --- |
| TXIDLE | 1 | Transmit idle symbols when the link is idle |
| TPRELEN | 4 | Length of preamble in bytes, default is 2 |
| TUPCNT | 8 | Number of frames transmitted as part of an "update programmable delays frame sequence" |
| TLTO* | 8 | Transmit link time out--if do not receive a frame within this interval, turn off |

TABLE III-continued

Transmit Status/Control Registers in the Illustrated Embodiment

| Mnemonic | # of bits | Description |
| --- | --- | --- |
| TOKTTO* | 8 | Transmit time out--if do not receive an ACK or NAK within this interval consider it a time out |
| TCERRCOK | 8 | Number of consecutive NAKs/TOs before TOK cleared |
| TKAINTV* | 8 | Interval between sending keep alive frames |
| TAQINTV* | 8 | Interval between bursts of frames sent to facilitate reacquistion |
| TAQLEN* | 8 | Duration of burst of frames sent to facilitate reacquisition |
| TCERRCNT** | 1 | Number of consecutive Xmit errors which have occurred |
| TOK** | 1 | Transmit link OK |

*The time interval is equal to 163840 cycles of the data clock 11 multiplied by the number specified.
**This register is written to by the state machine.

TABLE IV

Receive Status/Control Registers in the Illustrated Embodiment

| Mnemonic | # of bits | Description |
| --- | --- | --- |
| RADCNT | 8 | Accummulate done count--number of bytes to accumulate over to find regions of transitions |
| RADCNTCD | 8 | Same as RADCNT except used for first accumulation after changing |
| RTAPDLYRWUPD | 1 | Wait for "update programmable delays" frame before updating the programmable delays |
| RCERRCOK | 8 | Number of consecutive RCV errors before clear |
| ROKRTO* | 8 | RCV time-out--if no frames for this interval clear |
| ROKRTAPDLY** | 4 | Delay setting for each tap of delay line |
| RTAPSAM** | 5 | Tap of delay line being sampled by multiplexer 23 |
| RINCPD** | 1 | Flag which indicates increment the programmable delays |
| RDECPD** | 1 | Flag which indicates decrement the programmable delays |
| RDCLEN** | 5 | Length of data cell in terms of delay line taps |
| RACNT** | 8 | Number of bytes have accumulated over |
| RATF** | 24 | Accumulate transition flags register |
| RCERRCNT** | 8 | Number of consecutive RCV errors which have occurred |
| ROK** | 1 | Receive link OK |

*The time interval is equal to 163840 cycles of the data clock 11 multiplied by the number specified.
**This register is written to by the state machine.

The illustrated embodiment uses the same encoding scheme as FDDI (fiber distributed data interface [Amit Shah G. Ramakrishnan. "FDDI: A High Speed Network", PTR Prentice-Hall Inc., 1994]), which is 4/5 bit encoding so a byte of eight bits of data is encoded into 10 data cells for transmission. As with FDDI the ten data cells are further encoded into NRZ1 (Non-Return-to-Zero, Invert-on-ones) format.

Figure 4:
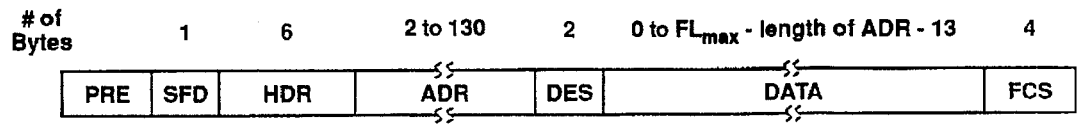
FIG. 4 is a diagrammatic illustration of a general frame format used in an embodiment of the present invention.
Figure 5:
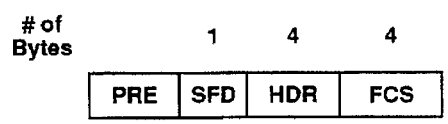
FIG. 5 is a diagrammatic illustration an acknowledge frame format used in an embodiment of the present invention.

In such an embodiment, the data being transmitted over the communication channel is formatted in frames as shown in FIG. 4 and FIG. 5. With reference to FIG. 4, general communication frame, as illustrated there, consists of seven fields. They are: a preamble (PRE), a starting frame delimiter (SFD), a header (HDR), an address (ADR), a descriptor (DES), a data field (DATA), and a frame check sequence (FCS). The number of bytes in each field are: PRE, variable; SFD, 1: HDR. 6; ADR. 2 to 130; DES, 2; DATA, 0 to Frame_Longmax—length_of_ADR_field—13: FCS. 4. The preamble is the first field to be transmitted, followed by the SFD, and continuing from left to right as shown in FIG. 4 until the FCS is transmitted. The most significant byte within a field is transmitted first, with the most significant bit within each byte transmitted first.

FIG. 5 shows the ACK frame format, which is sent in the same order as the frame of FIG. 4—i.e., preamble (PRE) field first. The other fields of the frame share nomenclature with the fields of FIG. 4, as well. The header of both the ACK and general formal frames include a two-bit field, called ACKOP, which can have any of the following values: 0=NOP (no-operation), 1=ACK (positive acknowledgment), 2=NAK (negative acknowledgment). 3=UPD (this is the first frame of an update programmable delays frame sequence). There is also a bit in the header of both frame types which is a copy of the transmitting end's ROK bit. If the ROK bit is on it indicates that the local end of the link is receiving properly.

The length of the preamble is variable. It should be set to a minimum of at least two bytes-four 5-bit symbols. These two bytes will give a time during which the multiplexer 23 can be switched without lost of actual data; these bytes are only used for switching the multiplexer when frames are back to back. The SFD symbols are used to establish byte synchronization. The number of bytes for the preamble is set by the variable TPRELEN (Table III) so that it can be made higher for some transmission media. For example some fiber-optic systems may require several bytes before they will properly transmit data.

Acquiring the Phase and Frequency of the Incoming Signal

Figure 6:
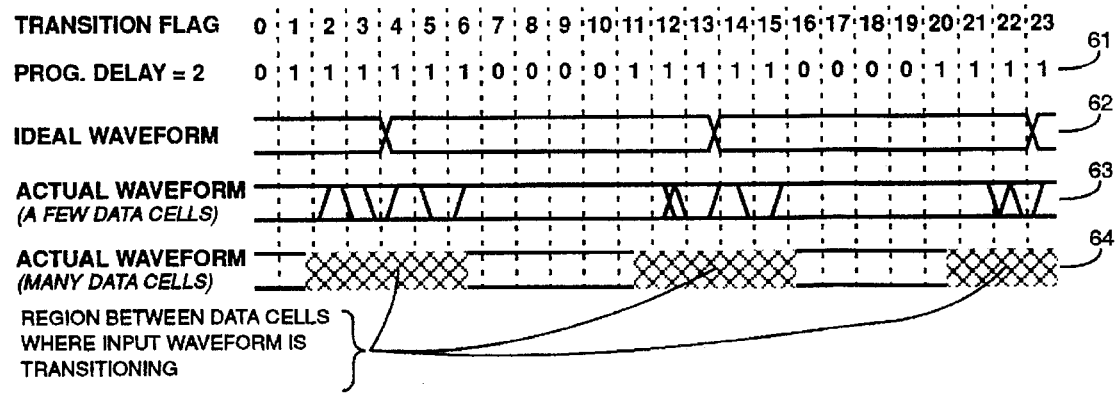
FIG. 6 is a diagrammatic illustration showing the relationship between transition flags and the received signal waveform.

FIG. 6 shows how au incoming waveform might be in the tapped delay line. In this example the programmable delays are set to 2 (using, for example 1.04 μs per tap). The actual waveform 64 shows the resulting reception of a large number of data cells. The transition region between cells represents the range of a substantially random distribution of real transition occurrences about an expected transition occurrence position. In a perfect transmission system, transitions, when they appear, would always appear at an expected time and would therefore occupy an expected position in the delay line, as shown in waveform 62. However, in any practical system, the expected position and the "region of transitions" represents a range of positions for what would be ideally a single position defining the ideal position of a single tap. The transition flags which would become set in response to these "regions of transitions" are shown as the flags 61.

Figure 7:
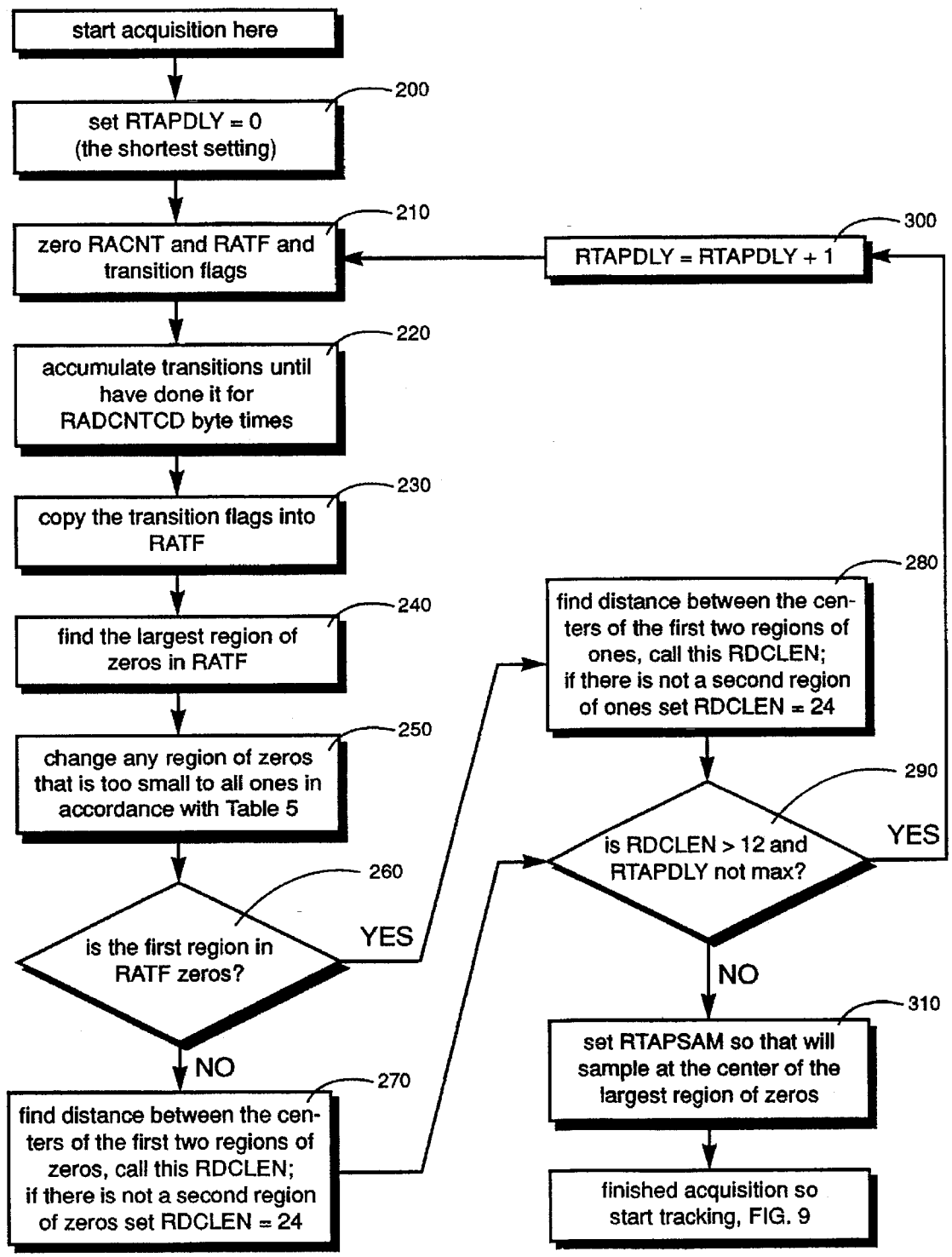
FIG. 7 is a flow diagram for the process used during the acquisition phase of an embodiment.
Figure 8:
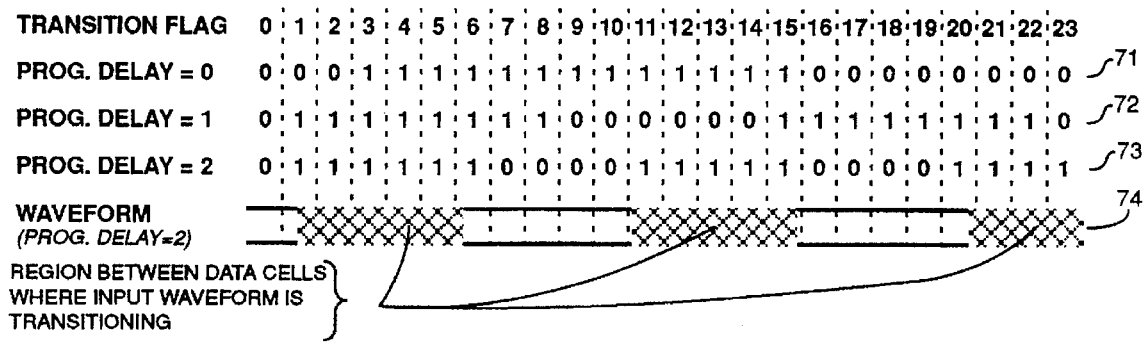
FIG. 8 is a diagrammatic illustration showing how the transition flags change as the programmable delays are set to different values.

FIG. 7 gives the process which is executed by the state machine during its acquisition mode, which is used during initialization and fault recovery. Steps 200 through 300 are to adjust for the frequency of the incoming data stream and the propagation delay of the circuit elements used lo implement the data delay line 25 (FIG. 1). The state machine starts with the programmable delays set to their minimum values and increments them up until at least two full data cells are in the delay line (RDCLEN less than or equal to 12). Incrementing, as opposed to a binary search, minimizes the possibility of aliasing the data (a condition that occurs when multiple transitions occur within one programmable delay). FIG. 8 gives an example of which transition flags become set for different settings of the programmable delays $25_0$-$25_{N-1}$ (FIG. 1). This figure will be discussed in more detail later.

Steps 210 through 280 (FIG. 7) find out how many programmable delays of the tapped delay line 25 (FIG. 1) a data cell occupies. In order to do this step 220 "accumulates" data over many incoming data cells. Due to noise, intersymbol interferencc, and other effects; the transitions, between one data cell and the next, will not always happen at the same locations in the tapped delay line 25 (FIG. 1). By accumulating over many incoming data cells, regions where transitions are occurring are found. This accumulation is taking place in the transition flags TF0-TF(N-1) ($43_0$-$43$, FIG. 3). The number of incoming data cells that should be accumulated varies with the nature of the communication channel being used. In the illustrated embodiment the number of byte times of the accumulation interval is programmed using the register RADCNTCD (receive accumulate done count after changing delays).

In this embodiment idle symbols may or may not be transmitted when the link is idle, depending on the transmission medium. If idle symbols are transmitted between frames: they, as well as any frames received, are used for finding the transition regions. If idle symbols are not transmitted between frames then the first TPRELEN (Table III) byte times worth of data are not used for accumulation of regions of transitions; this is done to allow the channel and receiver to reach equilibrium, after a period of not receiving anything.

Once the accumulation is finished, step 230 (FIG. 7) copies the transition flags $43_0$-$43_{N-1}$ (FIG. 3) into the internal register RATF (accumulate transition flags) of state machine 47. It is possible that a few transition flags will not be set within a transition region, steps 240 and 250 take care of this problem. Step 240 finds the largest region of zeros (region with no transitions). Step 250 then deletes any regions of zeros that are too small, making them part of a region of ones (a region where transitions are occurring). In an embodiment described here, this is done in accordance with Table V.

TABLE V

Deletion of Small Regions of Zeros for the Illustrated Embodiment

| Size of largest region of zeros | Delete regions of zeros this size or smaller |
| --- | --- |
| 1 | — |
| 2 | — |
| 3 | 1 |
| 4 | 1 |
| 5 | 2 |
| 6 | 2 |
| 7 | 3 |
| 8 | 3 |
| 9 | 4 |
| 10 | 4 |
| 11 | 5 |
| 12 | 5 |
| 13 | 6 |
| 14 | 6 |
| 15 | 7 |
| 16 | 7 |

Steps 260, 270 and 280 (FIG. 7) find the length of a data cell in terms of the number of programmable delays occupied by a data cell. This is done by measuring the distance between the centers of either regions where the transition flags are zeros (not set) or regions where they are ones (set). The first full region (a region not cut off by the end of the delay line) of either zeros or ones is used in making this measurement. It is assumed that the first region is cut off, making the second region the first full one, so it is the distance between the second and fourth regions that is measured. The resulting measurement is put into the register RDCLEN (data cell length), which is a register internal to the state machine 47 and holds the value of a parameter named RDCLEN. If there are not two regions of the type being measured, it is assumed that the programmable delays $25_0$–$25_{N-1}$ (FIG. 1) are currently too short and RDCLEN is set to 24 so that steps 290 and 300 will increase the delay of the programmable delays.

Step 290 looks at RDCLEN (i.e., the parameter value). If RDCLEN is twelve or less, then the goal of having at least two full data cells in the delay line 25 has been accomplished and the state machine goes on to step 310. Otherwise, the settings for the programmable delays are increased by one—assuming they can be—and the state machine goes back to step 300 followed by step 210. If the programmable delays are already at their maximum, the state machine goes on to step 310 regardless of the value of RDCLEN.

Step 310 (FIG. 7) selects the programmable delay's output (i.e., the tap) which corresponds to the center of the largest region of zeros (i.e., region with no transitions) to be used as the sampled data stream. This is done by setting the value of the state machine's internal receive tap sample register RTAPSAM (Table IV) which in turn causes multiplexer select lines 29 (FIG. 1 and FIG. 3) to choose for output from the multiplexer 23, the appropriate D flip-flop output $27_i$.

Figure 9:
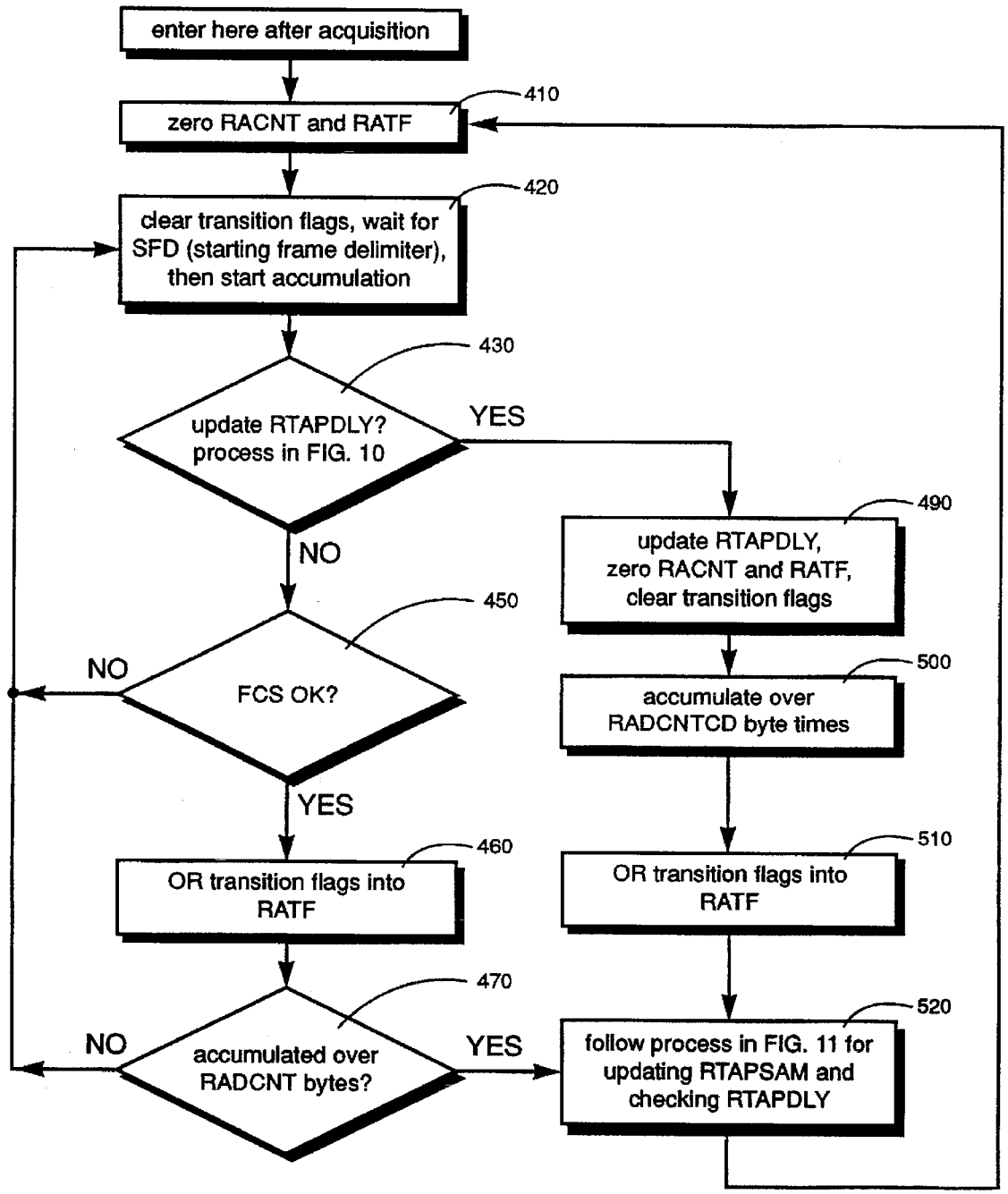
FIG. 9 is a flow diagram for the process used during the tracking phase of an embodiment.
Figure 10:
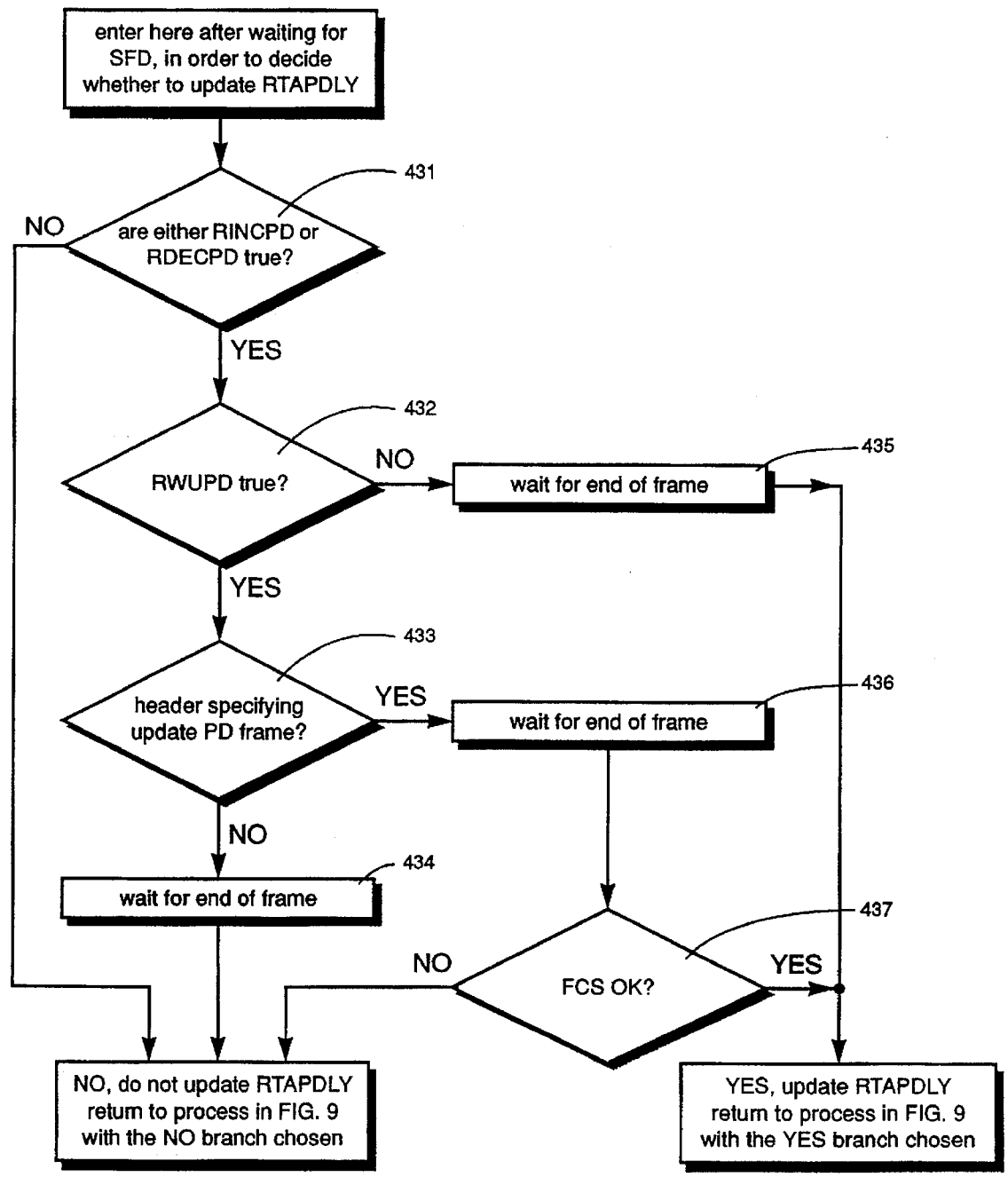
FIG. 10 is a flow diagram for the process used to decide whether to update RTAPDLY (the amount of delay provided by programmable delays of the tapped delay line) in an embodiment, this process is represented by 430 in FIG. 9.
Figure 11:
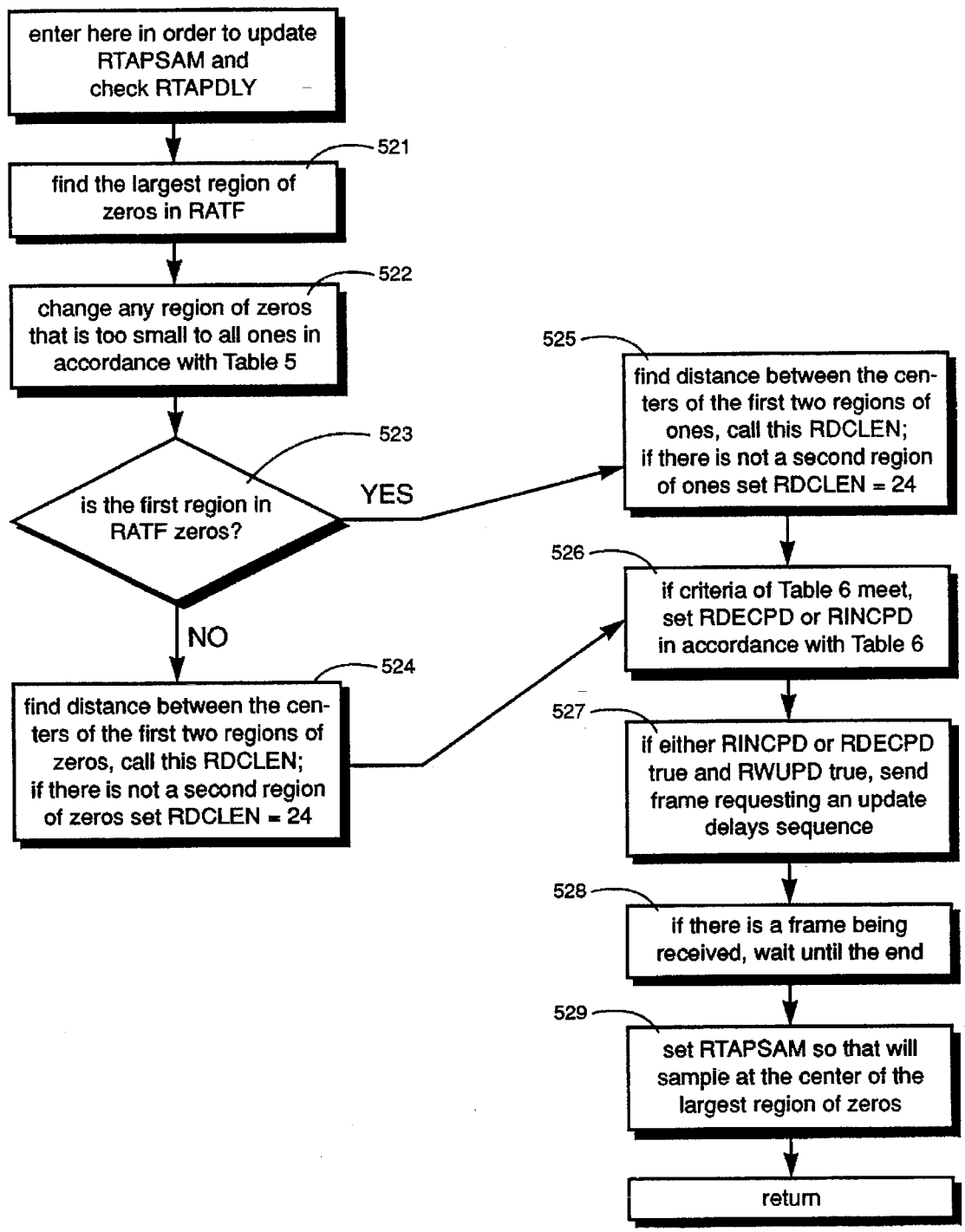
FIG. 11 is a flow diagram for the process used to update RTAPSAM (the tap of the tapped delay line being chosen as the sampled data stream) and RTAPDLY in an embodiment, this process is represented by 520) in FIG. 9.

With the completion of step 310 the process has now been completed and the state machine begins the execution of the process given in FIG. 9, FIG. 10 and FIG. 11 in order to track changes in the frequency or phase of the incoming signal as well as any changes in the propagation delay of circuit elements used to make up the programmable delays $25_0$–$25_{N-1}$ (FIG. 1). The process of tracking the incoming signal will be discussed in detail later.

FIG. 8 gives an example of the process of initially setting the programmable delays. This is the process given by FIG. 7 and Table V. In this example it is assumed that the data stream clock rate is 100 MHz and that the propagation delay of the circuit elements used to make up the programmable delays are their typical values as given in Table 1. Table 11 gives the propagation delay of each programmable delay as a function of the setting of the programmable delays. The process of finding the proper setting for the programmable delays goes as follows:

1. The state machine starts off with the programmable delays set to their shortest setting. This gives each of them a known delay of, for example, 0.4 ns. With a data stream clock of 100 MHz a single data cell is 10 ns in duration. With the programmable delays set at 0 (0.4 ns), a data cell will be 25 taps of the delay line 25 in length. This is too long to be measured by the tapped delay line as shown by the transition flags 71 (FIG. 8). The state machine will increase by 1 the setting of the programmable delays.
2. With the programmable delays set to 1, which corresponds to 0.72 ns per tap, 72 shows the centers of the regions of ones are at 4.5 and 18.5. 18.5–4.5=14, indicating that a data cell is 14 taps long. Since this is greater than 12, Steps 290 and 300 (FIG. 7) of the state machine will increase the setting of the programmable delays by one.
3. With the programmable delays equal to 2, which corresponds to 1.04 ns per tap, a data cell will be 13–3.5=9.5 taps long, as shown by 73. This is less than or equal to 12, so the state machine will leave the programmable delays set to 2.
4. The output 28g is at the center of the largest region of zeros, so the state machine will use the multiplexer 23 to select it as the one to sample for the data stream output.
5. The slate machine has now completed acquisition, so it is switched to the tracking mode.

Guaranteeing Enough Frames for Acquisition and Tracking

Figure 12:
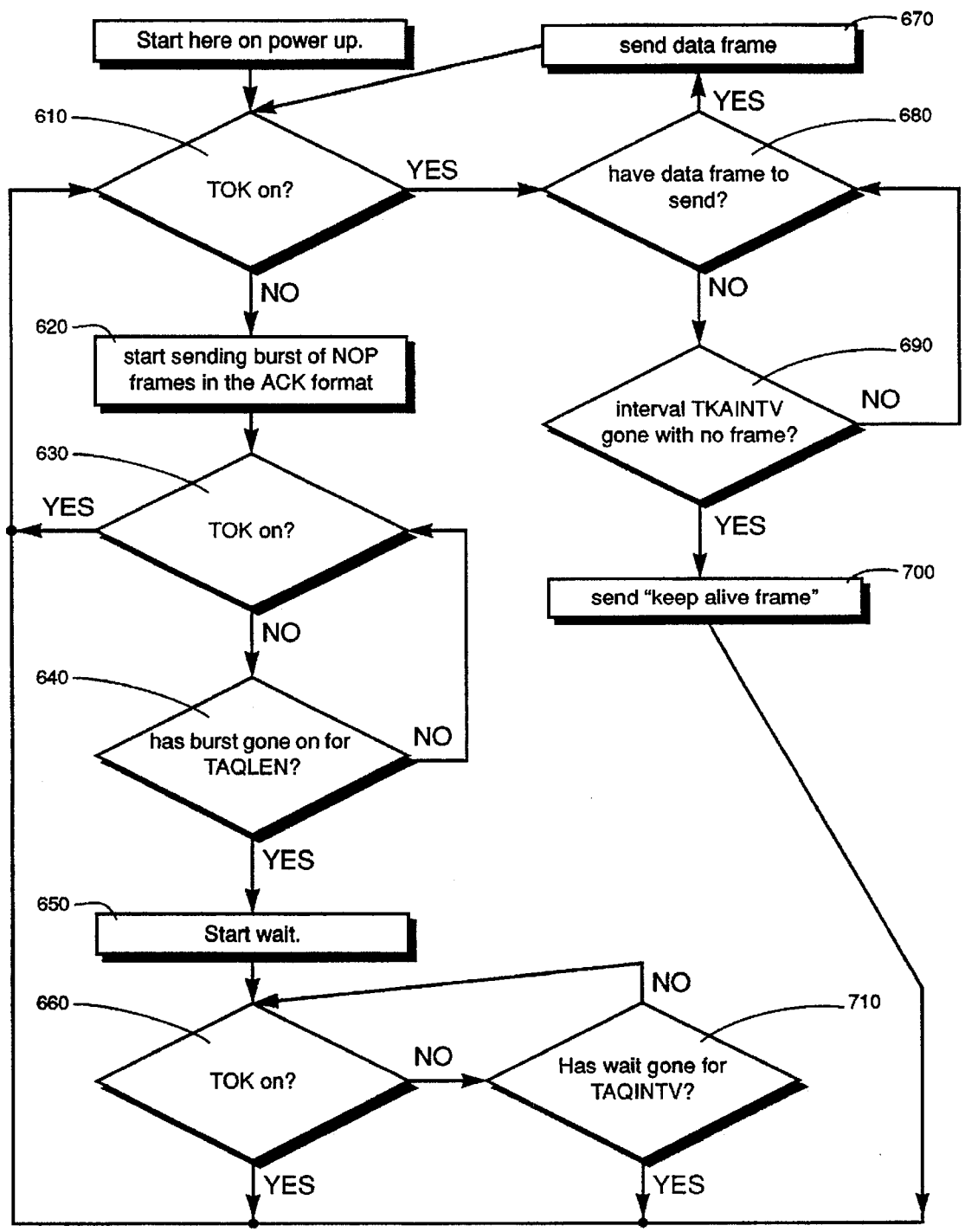
FIG. 12 is a flow diagram for the process on the transmit side of a link used to keep track of link status and guarantee minimum levels of traffic in an embodiment.
Figure 13:
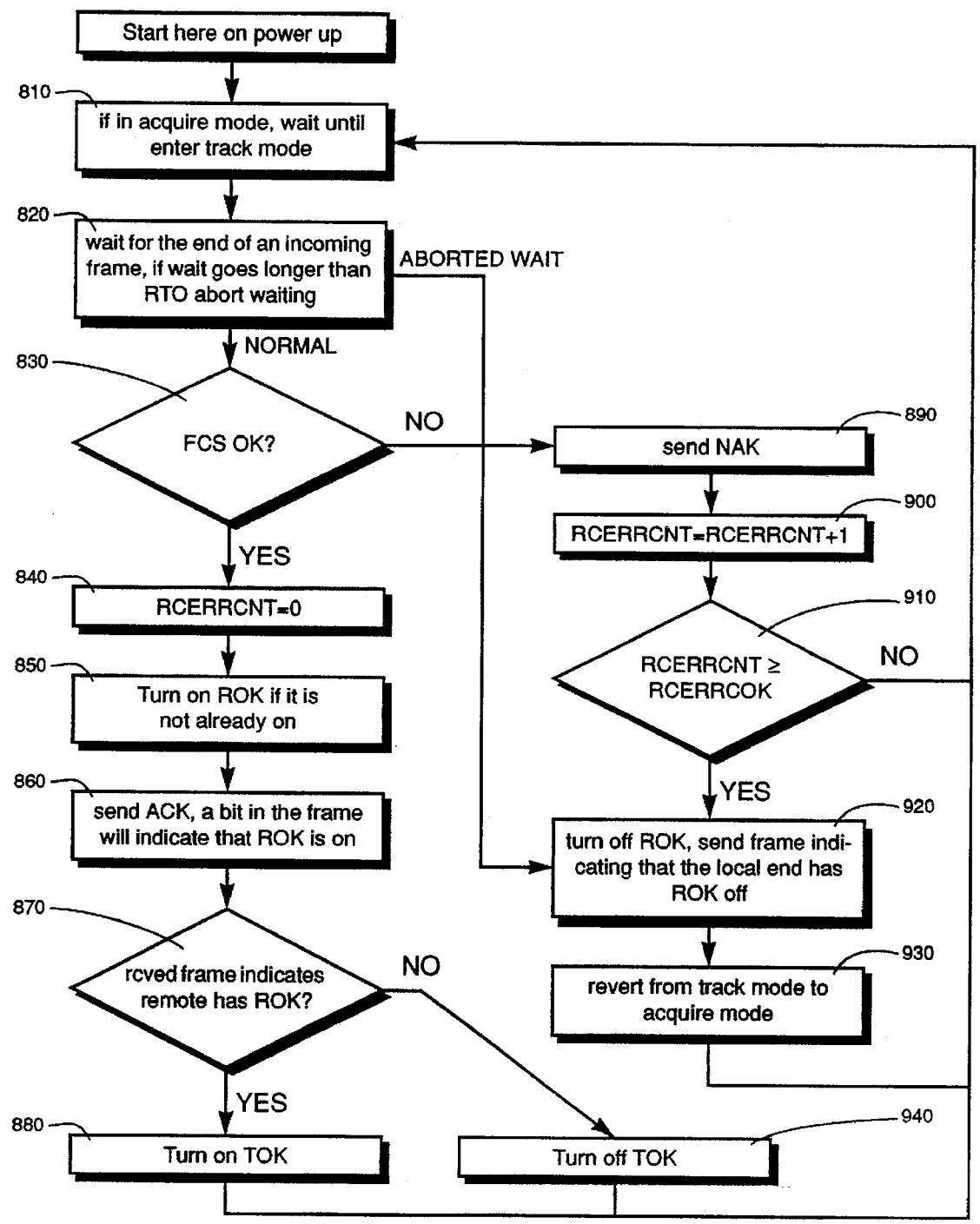
FIG. 13 is a flow diagram for the process on the receive side era link used to keep track of link status and guarantee minimum levels of traffic in an embodiment.

When idle symbols are not transmitted between flames, it is important to make sure there are sufficient incoming frames in order to be able to acquire the signal in a timely manner during initialization and fault recovery. It is also important to have enough frames going across the link to be able to track any changes, as will be discussed later. FIG. 12 and FIG. 13 give flow diagrams for the processes in the illustrated embodiment, which keep track of link status and makes sure that the required minimum levels of traffic are present. FIG. 12 is the process associated with transmission and FIG. 13 is the process associated with the reception of frames. Although these figures show some of the logic involved in sending and receiving data frames (frames that are doing more that just link house keeping) they do not attempt to show all the logic that would be used for flow control and the retransmission of frames in response to transmission errors. They also do not include the logic associated with the transmission and reception of an "update programmable delays frame sequence", which will be discussed later.

When the system is first powered up or recovering from a fault, steps 610, 620, 630, 640, 650, 660 and 710 (FIG. 12) keep transmitting bursts of frames. These are frames of the ACK frame format given in FIG. 5 with their 2-bit ACKOP field set to 0 indicating a NOP (no-operation). The bursts will continue to be sent until TOK comes on, indicating that the link is up (the link has to be up in both directions for TOK to come on). While the remote end is going through the acquisition process described earlier it is best to transmit frames continuously. The length of the burst is determined by TAQLEN. The length is chosen such that under normal conditions the link will come up well before the burst has gone on for TAQLEN. Once TOK comes on the burst will be aborted. If the transmission media is inoperative the entire burst will be transmitted and then the transmitting end will wait for a length of the specified by TAQLEN before transmitting another burst. The transmitting end will keep alternating bursts with pauses until the link comes up. In the illustrated embodiment bursts with pauses are used instead of continuous transmission in order to conserve power in the event that the link is inoperative due to a hard failure.

The logic associated with retransmission of frames (not shown in figures) will turn off TOK if there are too many consecutive transmission errors. Too many is defined by the register named TCERRCOK (Table III). If there is no ACK or NAK to a data frame (a frame of the general frame format which is carrying data) within a time specified by the register TTO (transmit time out) this occurrence will be counted as a transmission error. The reception of a NAK will also be considered a transmit error. TCERRCNT (Table III) is a corral of the number of transmit errors. Also if there are not frames received for longer than the interval defined by the register TLTO (transmit link time out), TOK will be turned off.

In order for the remote end to track phase changes of the incoming data stream, a minimum level of traffic is required. Steps 680, 690 and 700 guarantee this traffic by transmitting a NOP frame whenever there has not been anything transmitted for longer than an interval defined by the register TKAINTV.

FIG. 13 shows the process at the receive end of a link. If FCS (frame check sequence) is OK on a received frame, steps 840 will zero the count of consecutive errors (RCERRCNT). Steps 850 and 860 turn on the ROK bit and send a frame to the remote end that serves both as an ACK and to update the status of the TOK bit (on the remote end). Steps 870, 880 and 940 update the TOK bit at the local end in response to the state of the ROK bit at the remote end (as communicated via incoming frames). If there are too many consecutive receive errors (either incorrect FCS or time-out) steps 920 and 930 turn off ROK and put the data sampling logic back into acquisition mode from tracking mode.

Tracking the Incoming Signal

FIG. 9 gives the process which is executed by the state machine, 47 during its tracking mode, which is used after the acquisition mode has completed the initialization or fault recovery process. FIG. 10 is the process followed to decide whether or not to update amount of delay provided by each tap of the programmable delay line, this decision is step 430. FIG. 11 is the process for implementing step 520. In other words FIG. 10 and FIG. 11 are like subprocesses to main process given in FIG. 9.

During the acquisition mode, the slate machine is not aware of the frame boundaries so all incoming symbols are accumulated over for finding the transition regions including idle symbols, with the exception of the first bytes after a period of nothing being transmitted. During the tracking mode, accumulation is only done over data cells from frames that are verified as being correct by checking the corresponding FCS (frame check sequence). This way the tracking process will not try to track noise during momentary outages. If it is not practical to check the FCS in a particular embodiment then the state machine could be made to accumulate over all symbols except for the first ones after a period of no data. When the FCS is not being checked, accumulation can also take place over idle symbols.

Step 410 (FIG. 9) initializes registers RACNT (count of number of bytes have accumulated over) and RATF (accumulate transition flags) in preparation for accumulation of transition flags over multiple frames. Step 420 clears the transition flags, waits for the beginning of a frame and starts the accumulation of a single frame. Step 430 decides whether to update the value in the register RTAPDLY which controls the propagation delay provided by each of the programmable delays. Step 430 also waits for the end of the frame. The process for making this decision is given in FIG. 10. Step 431 of FIG. 10 checks to see if either of the two flags indicating that programmable delays should be changed (either up or down in propagation delay) are set. If neither of these flags (RINCPD or RDECPD) is set, the decision is made to not change the programmable delays. The flag RWUPD indicates that if the programmable delays are going to be changed, an "update programmable delays frame sequence" should be used for this purpose. Step 433 checks the header of the frame currently coming in to see if it is the first frame of an "update programmable delays frame sequence". If the frame is the first of an "update programmable delays frame sequence" step 436 will wait for the end of this frame and set 437 will make sure the FCS is OK.

Step 450 (FIG. 9) checks the FCS. If the FCS is OK, step 460 will ORs the transition flags resulting from the previous frame into RATF (accumulate transition flags). Step 470 checks to see if enough bytes have been accumulated over.

If step 430 decides to change the register RTAPDLY. Step 490 updates RTAPDLY, changing the propagation delay provided by the programmable delays. Step 490 also initializes RACNT, RATF and the transition flags in preparation for accumulation. Step 500 accumulates over RADCNTCD byte times. Step 510 ORs the result of step 500 into the register RATF. Step 520 executes the process given in FIG. 11 in order to update RTAPSAM (which tap from the delay line is being selected by multiplexer 23).

In FIG. 11 steps 521, 522, 523, 524 and 525 find the length of a data cell in terms of the number of taps in the same way that steps 240, 250, 260, 270 and 280 (FIG. 7) do during the acquisition process. Step 526 uses the criteria given in Table VI for deciding if it should set a flag (RINCPD or RDECPD) indicating a desire for changing RTAPDLY. If RINCPD or RDECPD are being se and the flag RWUPD is set, step 527 will send a frame requesting the remote end to send an "update programmable delays frame sequence". Steps 528 and 529 wait until the end of the current frame (if there is one) and then update the RTAPSAM which causes the multiplexer to select the tap which is in the center of the largest region of zeros.

TABLE VI

Criteria for Changing Programmable Delays for the Illustrated Embodiment

| Value of RTAPSAM | Value of RDCLEN | Action* |
| --- | --- | --- |
| RTAPDLY = 1 | RDCLEN < 5 | Set DECPD |
| RTAPDLY = 2 | RDCLEN < 6 | Set DECPD |
| RTAPDLY = 3 | RDCLEN < 7 | Set DECPD |
| RTAPDLY = 4 OR RTAPDLY > 4 | RDCLEN < 8 | Set DECPD |
| RTAPDLY < 9 OR RTAPDLY = 9 | RDCLEN > 12 | Set INCPD |

This table is referenced as part of the process specified by FIG. 11.
*The action is taken if both the conditions for the value of the RTAPSAM and the value of RDCLEN are met.

In the illustrated embodiment the programmable delays are changed just after the end of a frame, if they are going to be changed at all. After the programmable delays have been changed, it will frequently not be possible to receive good data until after the multiplexer selection has been updated to select the appropriate tap in the programmable delay line. In order to prevent the loss of real data, the illustrated embodiment will be operated with the bit RWUPD true. With this bit true the receiver will send a frame to the transmitting end requesting it to send an "update programmable delays frame sequence" whenever it detects the need for the programmable delays to be changed. The transmitting end will response with an "update programmable delays frame sequence". An update programmable delays frame sequence consists of: an ACK frame with the ACKOP field set to UPD indicating that this is the first frame of an update programmable delays frame sequence: followed by enough ACK frames, with ACKOP set to NOP, to allow the receiving end to accumulate transitions over the number of bytes specified by RADCNTCD (Table IV). The number ACK frames—with ACKOP set to NOP—transmitted, as part of an update programmable delays frame sequence is specified by the register TUPCNT (Table III).

The act of changing the multiplexer 23 (FIG. 1) might put a glitch on the data stream. It is also possible that changing the multiplexer will cause a data cell or data cells to be repeated or skipped by jumping over them in the tapped delay line. Step 528 waits until the end of a frame before changing the tap selected by the multiplexer. Since frames start with at least a 2-byte preamble, even if a frame immediately follows the one after which the multiplexer selection is changed, at worst some of the preamble will not be received properly.

In operation it is expected that the setting of the programmable delays will not change very often after the system has warmed up and reached thermal equilibrium. When the programmable delays are changed: either transmission time is given up while an "update programmable delays frame sequence" is transmitted or it is likely that data will be lost while the state machine "figures out" where to sample the incoming data stream. For this reason the criteria for changing the programmable delays preferably is chosen to be very conservative. It tries to maintain the value of RDCLEN between 8 and 12 taps of the delay line but gives avoiding oscillation a higher priority than staying between 8 and 12.

For very low settings of the programmable delays, the jump in delay (Table 11) from one setting to the next is so large that if the criteria for changing the programmable delays were chosen to try to keep RDCLEN between 8 and 12 the state machine might oscillate between two settings of the programmable delay lines. For example, assume a signal with a data cell length of 5 ns (i.e., baud rate of 200 Mhz); if with RDCLEN equal to 7 the programmable delays were changed from a setting of 1 to 0, RDCLEN would increase to 1.8 (ratio of delay for N=1/N=1)×7=12.6. The state machine might very well measure RDCLEN to be greater than 12 (which it is) and then decide to increment the setting of the programmable delay lines. Hence the programmable delay lines would keep oscillating between a setting of 0 and 1. This problem is solved by having different criteria for changing the setting programmable delays for low settings of the programmable delays, see Table VI. Another way lo solve this problem would be to have finer control on the lowest settings of the programmable delays; this was not practical with the circuit elements available and the desire to be able to operate at the highest baud rates practical.

Figure 14:
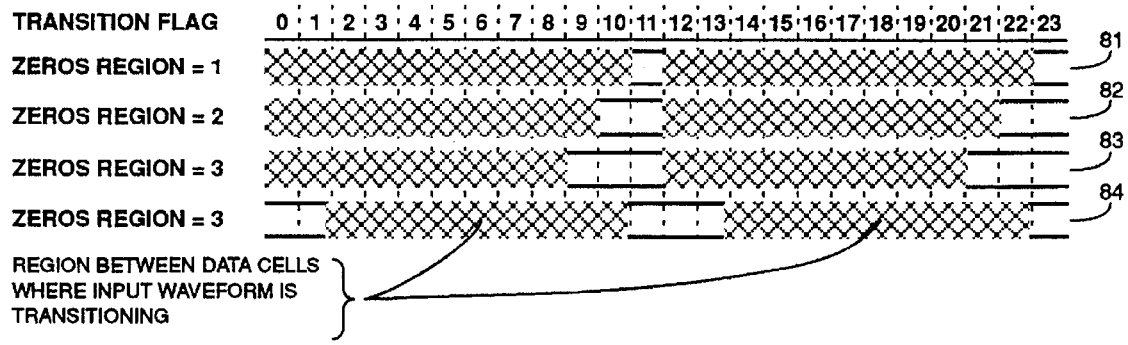
FIG. 14 is a diagrammatic illustration of exemplar groups of transition flags which might be set in response to a received data stream with data cells equal in length to 12 taps of the tapped delay line.

FIG. 14 gives some examples of how a waveform with RDCLEN=12 might look in the tapped delay line. Waveform 81 has a region of zeros which is only 1 tap wide. This signal is pretty marginal—if the setting of programmable delays were increased, the region of zeros might end up being less than one tap in width, making it impossible to receive reliably. Although the signal with the region of zeros equal to 1 is marginal, it serves to illustrate the operation of the illustrated embodiment under extreme conditions. In this example the transition region between two data cells is 11 taps wide. Waveforms 82, 83 and 84 illustrate what other waveforms with RDCLEN=12 might look like.

Figure 15:
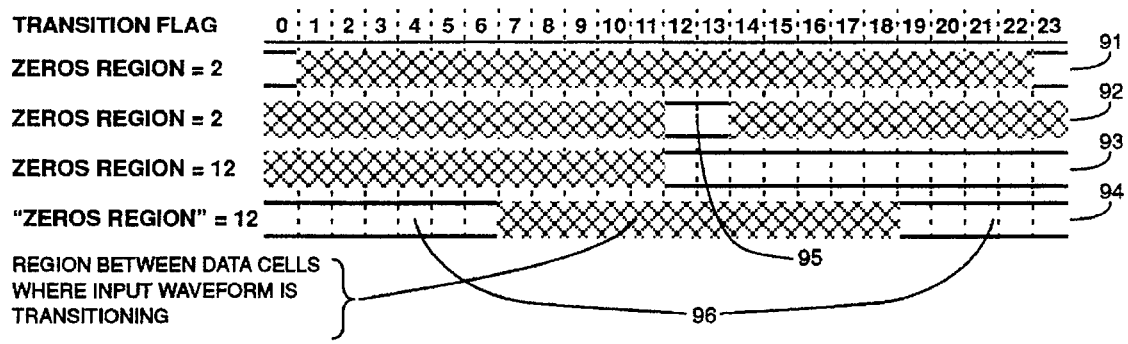
FIG. 15 is a diagrammatic illustration of exemplar groups of transition flags which might be set in response to a received data stream with data cells equal in length to 24 taps of the tapped delay line.

FIG. 15 gives some examples of how a waveform with RDCLEN=24 might look in the tapped delay line. The state machine will try get two complete data cells in the delay lines. In cases such as that shown in waveform 92 of FIG. 15 where there is a single region of zeros 95 near the center, the state machine cannot measure the width of a data cell. In this case step 524 (FIG. 11) will be trying to measure the distance between the centers of two regions of zeros, and since it will not find a second region of zeros it will set RDCLEN equal to 24 (it is just by happenstance that in this example 24 is the correct value). If possible the state machine will increase the value of the programmable delays. If the programmable delays are already at their maximum setting, in the case of waveform 92, the state machine will still be able to find the center of a region of zeros, properly sampling the data stream.

Waveform 94 in FIG. 15 has a "region of zeros" 96 which is 12 taps wide and is split into two subregions therefore, the state machine will see it as two different regions of zeros, one which is 7 taps wide and one which is 5 taps wide. The sampling point will be picked as the output of tap 3. The optimum sampling point, which is at the center of the data cell, would be the output of either tap 0 or 1. Although the optimum decision is not being made there should be no trouble receiving good data in this situation. In this situation it is important to accumulate transitions over enough data (i.e., RADCNT large enough) that the actual region of transitions are not significantly larger than the ones that the state machine finds. If the accumulation is over a small number of bytes, it is possible that the full extent of the region of transitions will not be found; as a consequence, the sampling point which is picked could be within the region of transitions, causing data to be lost.

Assume that the illustrated embodiment is fabricated with circuit elements that have a variation in their propagation delays of between 0.65 X and 1.8 SX over process variation, temperature and supply voltage. The minimum reliable baud rate, under worse case conditions, is that rate which will have RDCLEN=24 with the programmable delays at their maximum settings and with the propagation delay of the underlying components at their minimum (factor of 0.65 times typical). This comes out to be: 24 (RDCLEN)×4.09 ns (max programmable delay setting)×0.65 (factor for variation in propagation delay of circuit elements)=63.8 ns which corresponds to 15.7 MHz. In reality, one could operate more slowly so long as the "region of zeros" is large enough that some of it is always in the delay line. It is recommend that operation with RDCLEN greater than 24 be avoided.

If the region of zeros is more that 25% of the data cell a waveform with RDCLEN=4 could be properly sampled. The maximum baud rate, under worst case conditions, for which this is true is: 4 (RDCLEN)×0.4 ns (minimum programmable delay setting)×1.8 (factor for variation in propagation delay of circuit elements)=2.88 ns which corresponds to 347 MHz. It turns out that this may not the limiting factor. The critical path is the propagation time out of the D flip-flops 27 (FIG. 1) through the XOR gates 41 (FIG. 3) followed by the setup time to the JK flip-flops 43 (FIG. 3). This comes to (1.38 ns+0.51 ns+0.44 ns)×1.8=4.19 ns which corresponds to 238 MHz.

It should be noted that the numbers used for propagation delays, in the embodiment given here, are not based on an actual layout of the circuit elements presented. When the circuit is actually laid out the capacitive loading will change the numbers somewhat. The numbers given here are intended to be representative for the purpose of illustration of principles, though. It is intended that the illustrated embodiment, if it were fabricated in a process corresponding to the numbers given here, could be operated reliably with data rates of between 20 and 200 Mbaud.

Additional Embodiments

Some systems may have a totally different phase for each frame but a data clock that is the nearly the same frequency. A system with a single data clock and multiple potential transmitters on the same bus is an example. In this case the state machine could be designed to accumulate transitions over some of the preamble and use this information to set the sampling point before the start of the actual data. Accumulation for the purpose of updating the value of RTAPDLY (the propagation setting for the programmable delays $25_0$–$25_{N-1}$) could be done during the data portion of the message with the programmable delays being updated just after the end of a frame—so that the changing of the programmable delays does not cause any data to be lost.

The illustrated embodiment is designed under the assumption that phase changes between the data and its clock are relatively slow—the phase does not change significantly over multiple frames. In a system wherein the phase is changing more rapidly, the state machine could be designed to accumulate over a fraction of a frame and then update the sampling multiplexer immediately, instead of waiting until the end of a frame. With such a scheme the sampling point might be updated many times during the course of a single frame. In this case it would be important to change the sampling point in such a way that the data stream is not disrupted. This is not a problem with the illustrated embodiment because that embodiment waits until just after the end of a frame to change the sampling point.

In a scheme in which the sampling point is updated many times during a single frame, frequency tracking can be accomplished by updating the value of RTAPDLY just after the end of a frame, using the preamble of the next frame, if necessary, to adjust the sample point. Alternatively, sample point adjustment could be performed during the frame after a change RTAPDLY. This would require accepting a loss of data, knowing that the protocol will request retransmission of lost frames. RTAPDLY should not need to be changed very often.

In the case of a system in which the data rates are significantly different for each frame, the state machine could be designed to reacquire the signal for each frame. In this case, the value of RTAPDLY and the sampling point could both be selected during the preamble. In a system that is not checking the FCS before using accumulation data it may be desirable to make the changing of the programmable delay lines more immune to noise. This can be done by requiring the state machine to make N consecutive decisions in a row (all pointing to the programmable delay lines being changed in the same direction) before the programmable delay) lines are actually changed.

In systems where it is desirable to save power a data detect circuit can be added to detect whether there is data coming in on signal 10. This data detect circuit could be used to gate the data clock 11 off to the remainder of the circuit, when there is not data coming in. The data detect circuit may be implemented using a copy of this clock which is not gated off.

While there have been shown and described several embodiments of the present invention, by way of example only, it will be obvious to those skilled in the art that various changes and modifications may be made therein without departing from the scope of the invention as defined by the appending claims.

I claim:

1. A method for setting the sampling phase of a receiver in a digital data communication system to match the phase of an incoming data stream, the data stream having data coded as a series of transitions, the receiver including a delay line with a plurality of serially coupled delay elements, each element having a delay value and an output, and then an array of bistable memory elements, each memory element associated with a delay element, comprising the steps of:

(a) capturing a portion of the data stream in the delay line;
 (b) setting a memory element corresponding to each delay element containing a transition;
 (c) repeating steps (a) and (b) to produce in the array of memory elements a first cluster of memory element settings as a first region of transitions and a second cluster of memory element settings as a second region of transitions;
 (d) selecting the output of a delay element associated with a memory element positioned approximately midway between the first region of transitions and the second region of transitions, to set the sampling phase; and
 (e) changing from a currently selected delay element output to a next selected delay element output just after the end of a frame, between frames.

2. A method for setting the sampling phase of a receiver in a digital data communication system to match the phase of an incoming data stream, the data stream having data coded as a series of transitions, the receiver including a delay line with a plurality of serially coupled delay elements, each element having a delay value and an output, and then an array of bistable memory elements, each memory element associated with a delay element, comprising the steps of:

(a) capturing a portion of the data stream in the delay line;
 (b) setting a memory element corresponding to each delay element containing a transition;
 (c) repeating steps (a) and (b) to produce in the array of memory elements a first cluster of memory element settings as a first region of transitions and a second cluster of memory element settings as a second region of transitions;
 (d) selecting the output of a delay element associated with a memory element positioned approximately midway between the first region of transitions and the second region of transitions, to set the sampling phase; and
 (e) wherein the data stream is organized as a series of frames, each frame having a frame checked sequence, and the step of setting a memory element retains only those settings resulting from frames that have a valid frame checked sequence.

3. A method for setting the phase of a receiver in a digital data communication system to match the phase of an incoming data stream, the data stream having data coded as a series of transitions, the receiver including (i) a delay line with a plurality of serially coupled delay elements, each delay element having a delay control input, an output, and a delay value selectable from a plurality of delay values according to the value of a delay line select signal received at the delay control input, and (ii) an array of bistable memory elements, each memory element coupled to receive a signal from the output of an associated delay element, the contents of the array of memory elements defining a binary array, the method comprising the steps of:

(a) resetting the memory elements;
 (b) capturing a portion of the data stream in the delay line;
 (c) setting a memory element corresponding to each delay element containing a transition:
 (d) repeating steps (b) and (c) a predetermined number of times to produce a cluster of memory element settings defining a region of transitions in the binary array:
 (e) changing the value of the delay time select signal to select a new delay value for each delay element and repeating steps (a) through (d) until the delay line contains two regions of transitions:
 (f) locating a first region of transitions and a second region of transitions; and (g) selecting the output of a delay element associated with a memory element positioned approximately midway between the first region of transitions and the second region of transitions.

4. A method for adjusting the sampling circuit of a receiver in a digital data communication system according to the frequency of an incoming data stream, the data stream having data coded as a series of transitions, the receiver including (i) a delay line with a plurality of serially coupled delay elements, each delay element having a delay control input, an output, and a delay value selectable from a plurality of delay values according to the value of a delay time select signal received at the delay control input, and (ii) an array of bistable memory elements, each memory element coupled to receive a signal from the output of an associated delay element, the contents or the array of memory elements defining a binary array, the method comprising the steps of:

(a) resetting the memory elements;
(b) capturing a portion of the data stream in the delay line:
(c) setting a memory element corresponding to each delay element containing a transition:
(d) repeating steps (b) and (c) a predetermined number of times to produce a cluster of memory element settings defining a region of transitions in the binary array; and
(e) changing the value of the delay time select signal to select a new delay value for each delay element and repeating steps (a) through (d) until the delay line contains two regions of transitions, the resulting value of the delay time select signal establishing a setting of the delay value for each delay element thereby adjusting the sampling circuit according to the frequency of the incoming data stream.

5. A method for setting the sampling phase of a receiver in a burst-mode digital data communication system to match the phase of an incoming data stream, the data stream having data coded as a series of transitions, the data stream transmitted in a series of bursts with a quiescent period between bursts, the receiver including a delay line with a plurality of serially coupled delay elements, each element having a delay value and an output, and an array of bistable memory elements, each memory element associated with a delay element, comprising the steps of:

(a) capturing a portion of the data stream in the delay line;
(b) setting a memory element corresponding to each delay element containing a transition:
(c) repeating steps (a) and (b) to produce in the array of memory element a first cluster of memory element settings as a first region of transitions and a second cluster of memory element settings as a second region or transitions;
(d) selecting the output of a delay element associated with a memory element positioned approximately midway between the first region of transitions and the second region of transitions, to set the sampling phase; and
(e) holding the selection of the selected output through quiescent periods.

6. A method for setting the sampling phase of a receiver in a burst-mode digital data communication system to match the phase of an incoming data stream, the data stream having data coded as a series of transitions, the data stream transmitted in a series of bursts with a quiescent period between bursts, the receiver including (i) a delay line with a plurality of serially coupled delay elements, each delay element having a delay control input, an output, and a delay value selectable from a plurality of delay values according to the value of a delay time select signal received at the delay control input, and (ii) an array of bistable memory elements, each memory element coupled to receive a signal from the output of an associated delay element, the contents of the array of memory elements defining a binary array, the method comprising the steps of:

(a) resetting the memory elements;
(b) capturing a portion of the data stream in the delay line;
(c) setting a memory element corresponding to each delay element containing a transition:
(d) repeating steps (b) and (c) a predetermined number of times to produce a cluster of memory element settings defining a region of transitions in the binary array;
(e) changing the value of the delay time select signal to select a new delay value for each delay element and repeating steps (a) through (d) until the delay line contains two regions of transitions:
(f) locating a first region or transitions and a second region of transitions;
(g) selecting the output of a delay element positioned approximately midway between the first region of transitions and the second region of transitions; and
(h) holding constant the variable delay and the position of the selected output through quiescent periods.

7. A method for adjusting the sampling circuit of a receiver in a burst-mode digital data communication system according to the frequency of an incoming data stream, the data stream having data coded as a series of transitions, the data stream transmitted in a series of bursts with a quiescent period between bursts, the receiver including (i) a delay line with a plurality of serially coupled delay elements, each delay element having a delay control input, an output, and a delay value selectable from a plurality of delay values according to the value of a delay time select signal received at the delay control input, and (ii) an array of bistable memory elements, each memory element coupled to receive a signal from the output of an associated delay element, the contents of the array of memory elements defining a binary array, the method comprising the steps of:

(a) resetting the memory elements;
(b) capturing a portion of the data stream in the delay line;
(c) setting a memory element corresponding to each delay element containing a transition;
(d) repeating steps (b) and (c) a predetermined number of times to produce a cluster of memory element settings defining a region of transitions in the binary array;
(e) changing the value of the delay time select signal to select a new delay value for each delay element and repeating steps (a) through (d) until the delay line contains two regions of transitions: and
(f) holding the variable delay constant through quiescent periods.

8. A method according to claim 3 or claim 4, wherein the data stream is organized as a series of frames, each frame having a frame check sequence, and wherein the step of setting a memory element retains only those settings resulting from frames that have a valid frame check sequence.

9. A method according to claim 3, wherein the data is organized as a series of frames, each frame having a preamble, wherein the step of selecting a delay element output is performed during the preamble, and the step of incrementing each variable delay is performed just after the end of a frame.

10. A method according to claim 3, wherein the data is organized as a series of frames, each frame having a preamble, wherein the step of selecting a delay element output is performed during any portion of the frame, and the step of changing the value of the delay time select signal is performed just after the end of a frame.

11. A method according to claim 3, wherein the data is organized as a series of frames, each frame having a preamble, wherein the steps of incrementing each variable delay and selecting a delay element output are both performed during the preamble of a frame.

12. A method according to claim 4, wherein changing the value of the delay time select signal to select a new delay value for each delay element consists of incrementing each variable delay from a shorter delay to a longer delay.

13. A method according to claim 4, further including the steps of:

storing memory element status for each delay element as a binary array;

determining the size of a largest region having no transitions in the binary array;

selecting a maximum size of a small region according to the size of the largest region;

locating a small region having no transitions; and replacing all binary values of the small region with binary values indicative of transitions.

14. A method according to claim 4 further including steps of:

detecting the presence of an incoming data stream: and suppressing sampling in the absence of an incoming data stream.

15. A method according to claim 4, wherein the data steam includes dummy data provided for the purpose of setting the sampling frequency.

16. A method according to claim 5, including the step of transmitting bursts of dummy data periodically to limit the length of the quiescent periods.

17. A method according to claim 7, including the step of transmitting bursts of dummy data periodically to limit the length of the quiescent periods.

18. A method according to claim 16, further including the step of reducing the frequency with which bursts of dummy data are transmitted to reduce power consumption.

19. A method according to claim 17, further including the step of reducing the frequency with which bursts of dummy data are transmitted to reduce power consumption.

* * * * *